United States Patent
Karnik et al.

(10) Patent No.: US 8,572,961 B2
(45) Date of Patent: Nov. 5, 2013

(54) TURBOCHARGER CONTROL

(75) Inventors: Amey Y. Karnik, Dearborn, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 614 days.

(21) Appl. No.: 12/821,996

(22) Filed: Jun. 23, 2010

(65) Prior Publication Data
US 2011/0314807 A1    Dec. 29, 2011

(51) Int. Cl.
*F02D 23/00* (2006.01)

(52) U.S. Cl.
USPC .............................. 60/602; 60/600; 60/605.2

(58) Field of Classification Search
USPC ......................................... 60/602, 600, 605.2
See application file for complete search history.

(56) References Cited

U.S. PATENT DOCUMENTS

| | | | |
|---|---|---|---|
| 5,755,101 | A | 5/1998 | Free et al. |
| 6,012,289 | A | 1/2000 | Deckard et al. |
| 6,886,335 | B2 | 5/2005 | Tabata et al. |
| 6,898,933 | B2 | 5/2005 | Klingseis |
| 6,928,817 | B2 | 8/2005 | Ahmad |

*Primary Examiner* — Ching Chang
(74) *Attorney, Agent, or Firm* — Julia Voutyras; Alleman Hall McCoy Russell & Tuttle LLP

(57) ABSTRACT

Various systems and methods for controlling a turbocharger of an engine via a wastegate are described. In one example, actuation of the wastegate is limited when outside a range, the limits of the range varying with boost pressure, turbine inlet pressure, turbine outlet pressure, and atmospheric pressure. In this manner, a tracking error may be reduced when controlling the boost pressure and using the boost pressure to actuate the wastegate in a boost-based wastegate configuration.

19 Claims, 6 Drawing Sheets

TURBOCHARGER CONTROL

FIELD

The present application relates to systems for controlling a turbocharger of an engine with a wastegate.

BACKGROUND AND SUMMARY

Engines may use a turbocharger to improve engine torque/power output density. In one example, a turbocharger may include a compressor and a turbine connected by a drive shaft, where the turbine is coupled to the exhaust manifold side and the compressor is coupled to the intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, such as with a wastegate.

In one example, the wastegate may include a first port coupled to boost pressure, a second port coupled to atmospheric pressure, and a valve configured to control the flow of exhaust gasses according to the wastegate duty cycle. This configuration may be referred to as a "boost-based" configuration because the force to actuate the wastegate valve comes from the boost pressure. A closed loop feedback control system may control the boost pressure by commanding the wastegate actuator to adjust the wastegate valve. However, commands to the wastegate actuator may not actually adjust the wastegate outside lower and/or upper limits of the boost pressure range. For example, at low boost pressure, the boost pressure may be too low to actuate the wastegate valve open. At high boost pressure, the wastegate valve may be actuated to an end position (e.g. wide open) and commands to open the wastegate valve further may not have the desired effect. The feedback control system may include an integral term for steady state tracking. If the feedback loop is broken (e.g. wastegate actuator commands do not have the desired effect), the integral term may introduce tracking error (e.g. integrator windup) in the feedback control system which may lead to oscillations, excessive overshoot, etc. In one solution, integrator windup may be reduced by freezing the integral term at the limits of the boost pressure. However, when the limits change due to changes in system operation, degraded control may again occur.

The inventors herein have recognized the above situation where actuation of the wastegate may be limited to a range, where the range may vary with engine operating conditions. One approach to address the above issues is a method that includes actuating the wastegate with boost pressure generated by the turbocharger. The adjustment of the wastegate actuator is limited when outside a range, where the limits of the range may vary in a specific interrelationship with boost pressure, turbine inlet pressure, turbine outlet pressure, and atmospheric pressure. In this way, the limits of the range may be used to, for example, freeze the integral term when the wastegate actuator is commanded to actuate the wastegate outside of the range. Thus, integrator windup of the feedback control system may be prevented or reduced to increase predictability of the feedback control system and to increase controllability of the boost pressure, while at the same time utilizing integrator feedback throughout as much of the range as possible.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
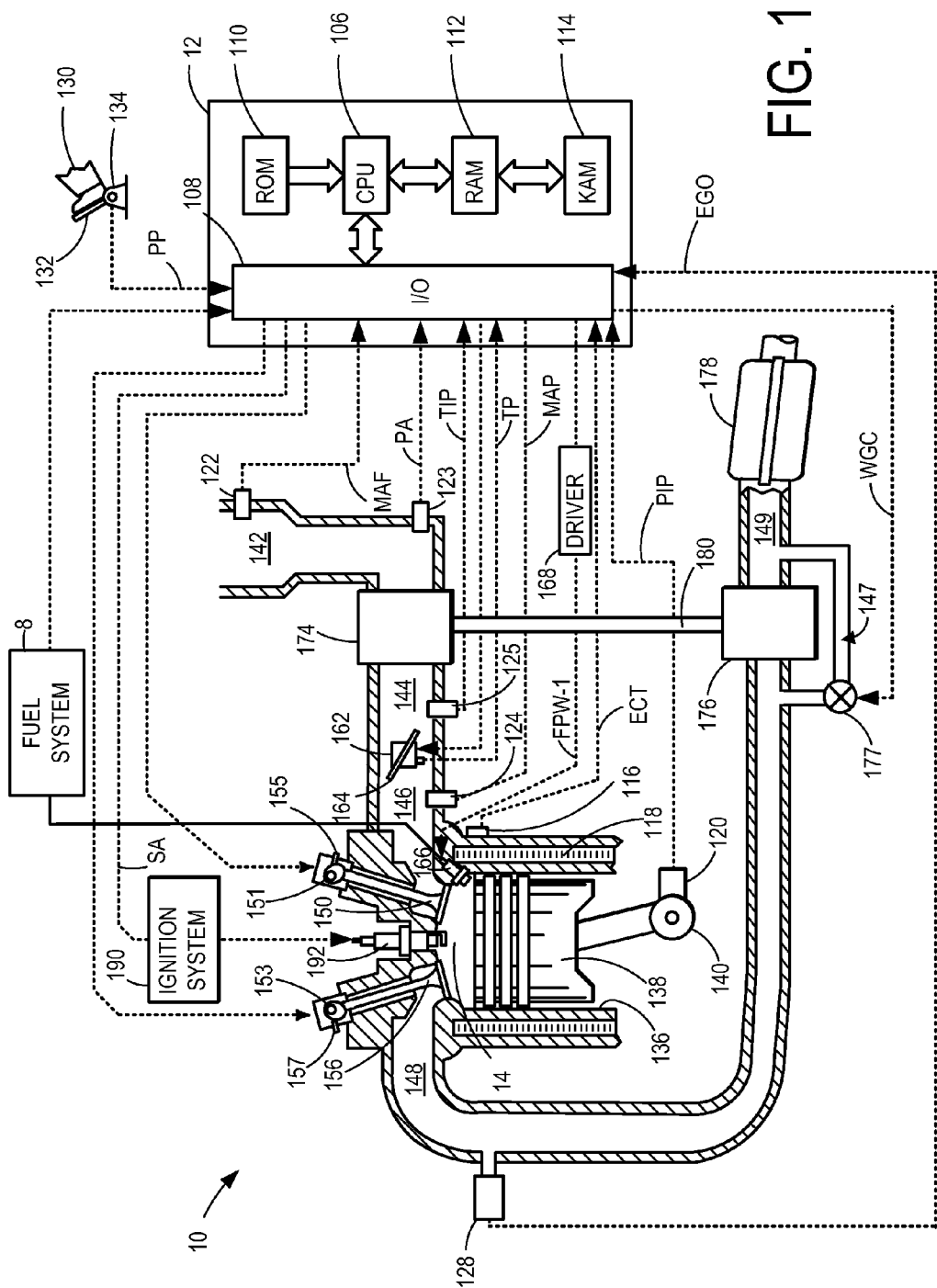
FIG. 1 shows a block diagram of a turbocharged engine including a wastegate.
Figure 3:
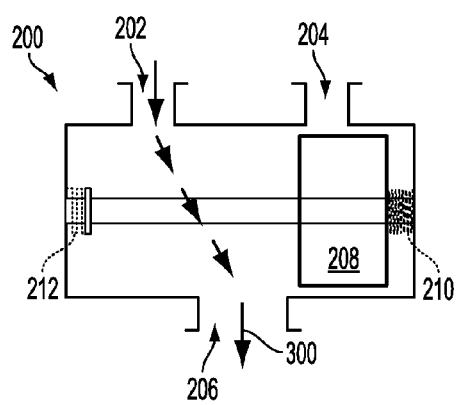
FIGS. 3 and 4 show an example of how the solenoid valve can be modulated to control the pressure of the wastegate canister.
Figure 4:
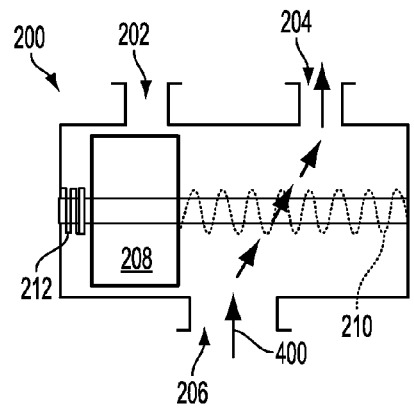
Figure 5:
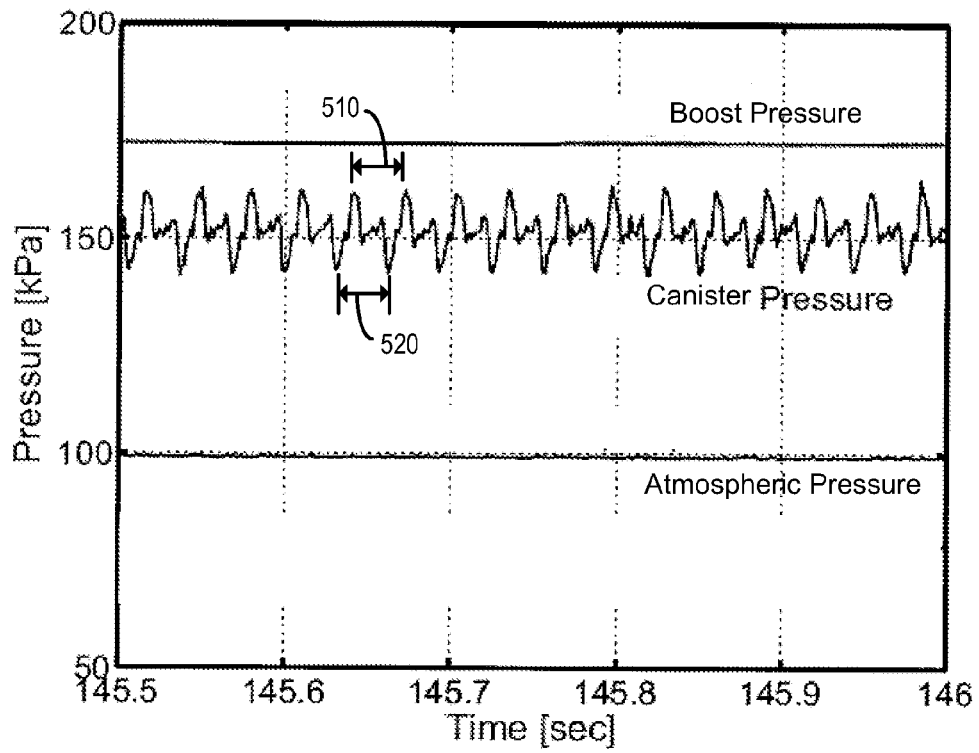
FIG. 5 shows prophetic data of wastegate canister pressure.
Figure 6:
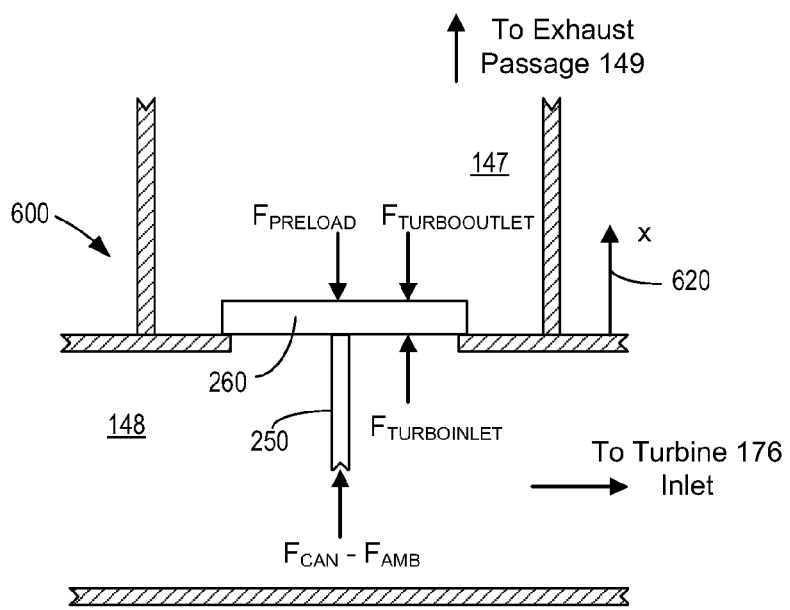
FIG. 6 shows an example embodiment of a wastegate valve and forces acting on the wastegate valve.
Figure 7:
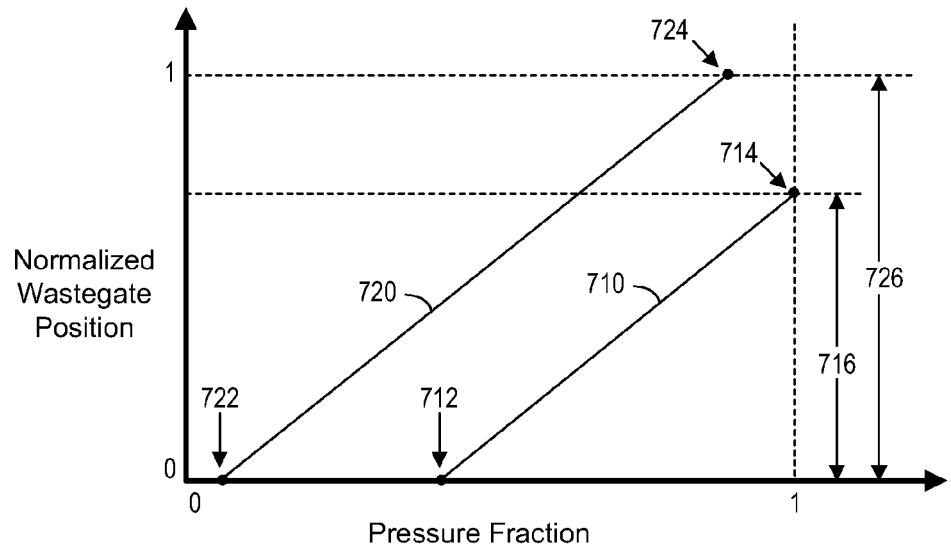
FIG. 7 shows prophetic data of how the wastegate actuator range may vary across different engine operating conditions.
Figure 8:
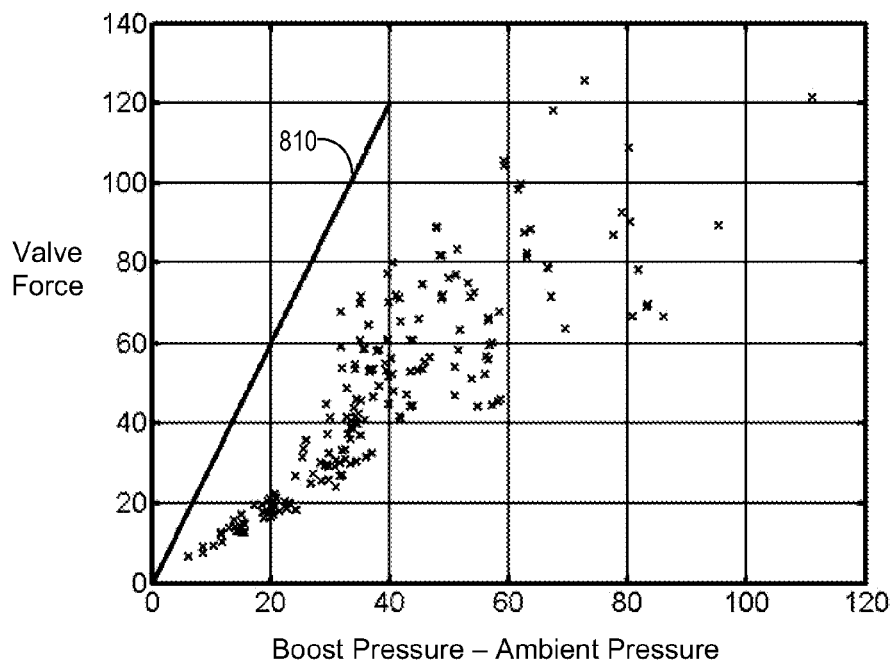
FIG. 8 shows prophetic data of a valve force due to exhaust pressures versus the difference between boost pressure and atmospheric pressure.
Figure 9:
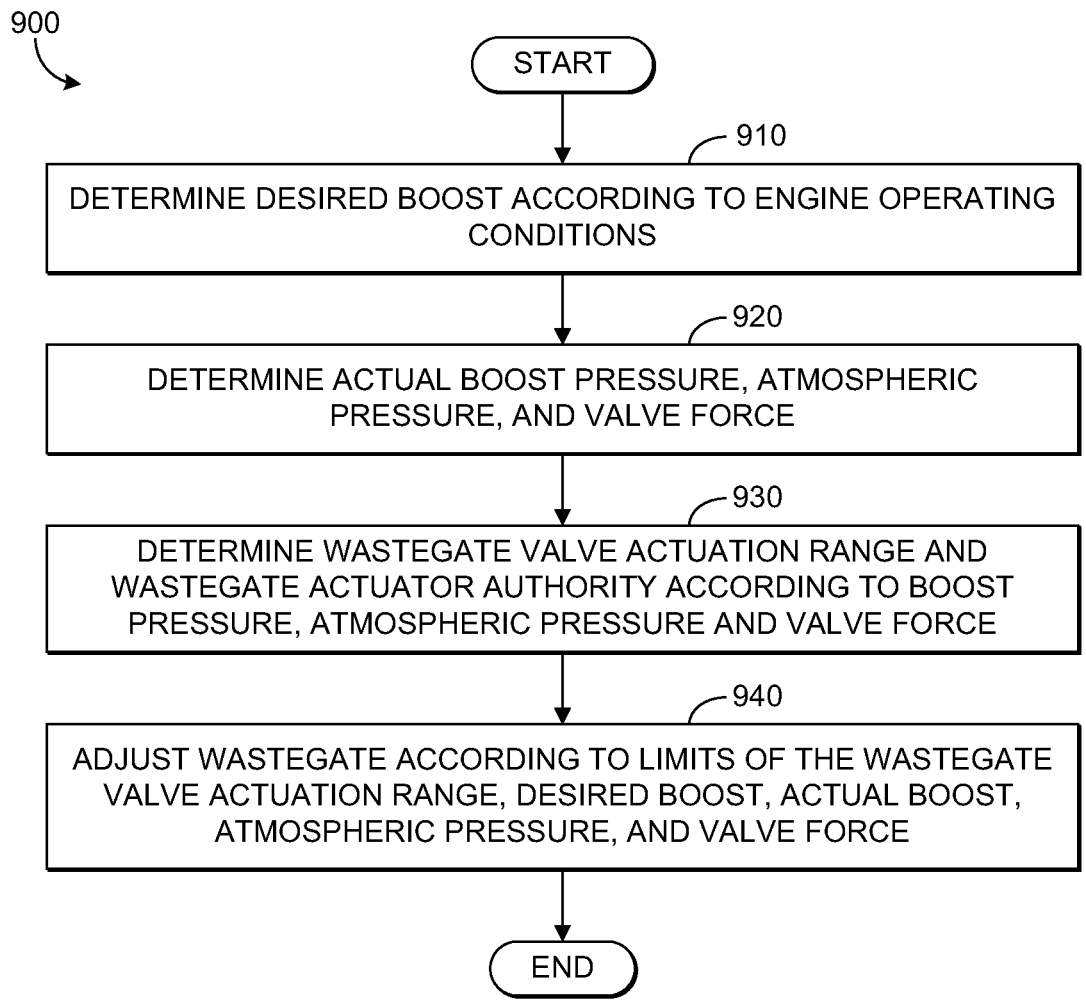
FIGS. 9 and 10 show example methods of controlling the turbocharger via a wastegate.
Figure 10:
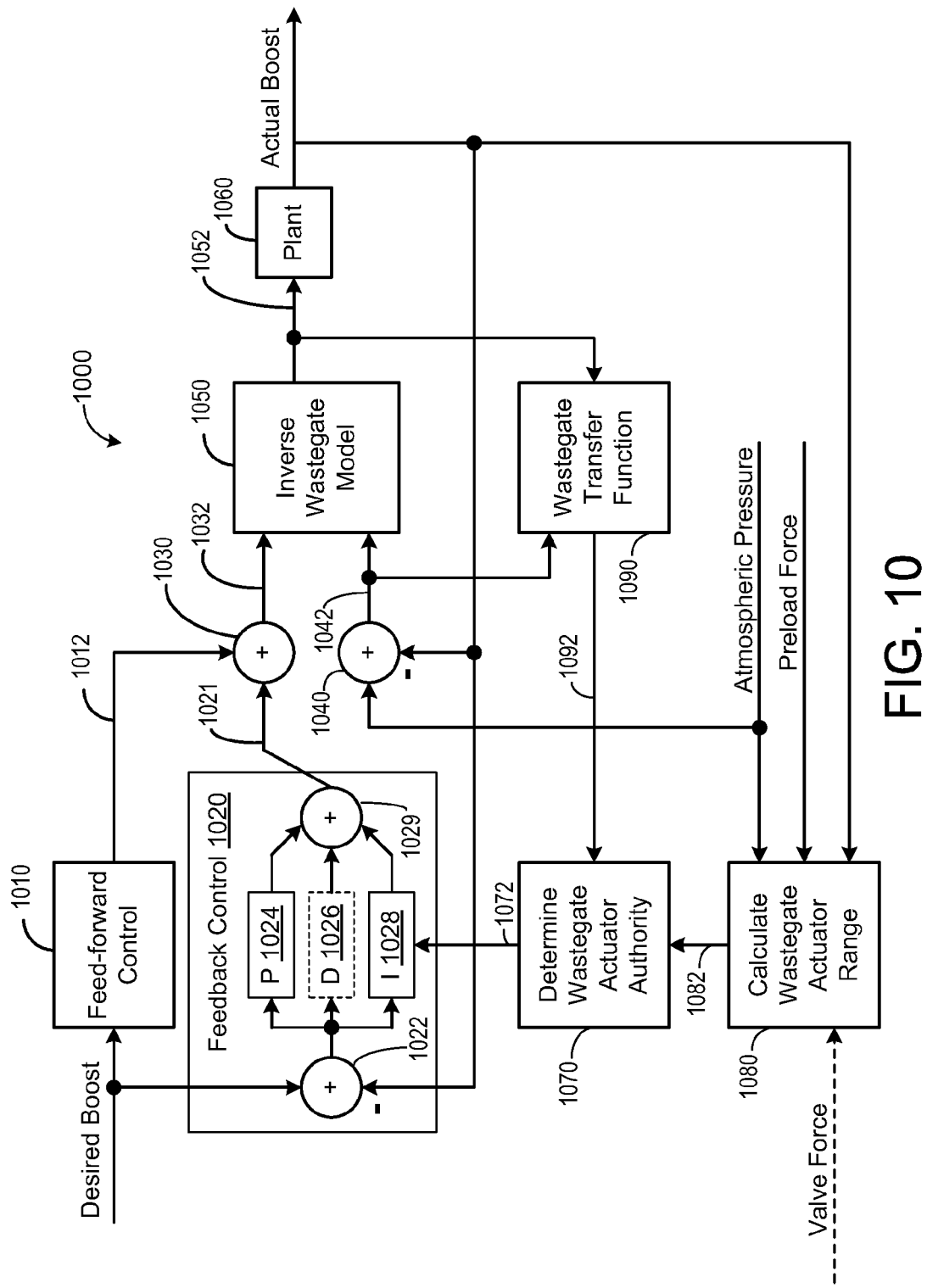

The following description relates to systems for controlling turbochargers of internal combustion engines via a wastegate. An example embodiment of an engine with a turbocharger including a wastegate is illustrated in FIG. 1. In the example configuration, the force for actuating the wastegate is provided by the boost pressure. The example wastegate is shown in more detail in FIG. 2. The example wastegate comprises a solenoid valve, a wastegate canister, and a wastegate arm for actuating a wastegate valve. In FIGS. 3 and 4, the solenoid valve is shown in two positions to illustrate how the solenoid valve may be used to control the pressure of the wastegate canister. FIG. 5 illustrates prophetic data of wastegate canister pressure when the solenoid valve is modulated as described in FIGS. 3 and 4. A force generated by the wastegate canister pressure may be used to control the turbocharger by actuating the wastegate valve to control the flow of exhaust gasses to a turbine of the turbocharger. An example embodiment of a wastegate valve is illustrated in FIG. 6. However, the wastegate valve may have a limited range of actuation that may vary with engine operating conditions, and adjustment of the wastegate valve may be limited when outside the range of actuation. The prophetic data of FIG. 7 illustrates how the range of actuation may vary with engine operating conditions, such as boost pressure, atmospheric pressure, and a valve force due to exhaust pressures. In one example, the valve force is proportional to a difference between the turbine inlet pressure and the turbine outlet pressure. The valve force may be estimated from the boost pressure and atmospheric pressure as illustrated with the prophetic data of FIG. 8. The range of the wastegate actuator may be determined as part of a control routine, such as illustrated in FIGS. 9 and 10, for adjusting the wastegate of FIG. 2 and controlling the turbocharger. In one embodiment, the control routine may include a feedback control system with an integral term for steady-state tracking. The limits of the range of actuation may be used to freeze the integral term when the wastegate actuator is commanded to actuate the wastegate outside of the range of actuation. Thus, integrator windup of the feedback control system may be prevented or reduced to increase predictability of the feedback control system.

FIG. 1 shows an example of a turbocharged engine including a wastegate. Internal combustion engine 10 comprises a plurality of cylinders, one cylinder of which is shown in FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a turbocharger boosting device. For example, engine 10 is configured with a turbocharger including a compressor 174 arranged between intake passages 142 and 144, and an exhaust turbine 176 arranged between exhaust passages 148 and 149. Specifically, air passage 142 is connected to the compressor inlet, air passage 144 is connected to the compressor outlet, exhaust passage 148 is connected to the turbine inlet, and exhaust passage 149 is connected to the turbine outlet. Compressor 174 may be at least partially powered by exhaust turbine 176 via a shaft 180. Wastegate 177 includes a path for exhaust gasses to flow from exhaust passage 148 away from turbine 176 through exhaust passage 147 to exhaust passage 149 downstream of the outlet of turbine 176. The energy supplied by turbine 176 may be controlled by controlling the amount of exhaust gas reaching the inlet of turbine 176 from exhaust passage 148. Specifically, the boost pressure may be adjusted by the WGC signal received from controller 12 by modulating a degree of opening, and/or a duration of opening, of a wastegate valve.

In the example embodiment, wastegate 177 is pneumatically actuated to control the wastegate valve and hence the boost pressure. In what is known as a "boost-based" wastegate configuration, wastegate 177 comprises a solenoid valve including a first port (not shown in FIG. 1) connected to intake passage 144 and a second port (not shown in FIG. 1) connected to an intake passage at or near atmospheric pressure, such as intake passage 142. The pressure of the first port is at the boost pressure and may be measured with sensor 125. The measurement may be sent to controller 12 via the TIP signal. Atmospheric pressure may be measured by sensor 123 and the measurement may be transmitted to controller 12 via the PA signal. In the example embodiment, the wastegate valve is normally closed, but force supplied by the boost pressure may be used to open the wastegate valve.

A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174. In one embodiment, an intercooler (not shown) may be disposed downstream of compressor 174 for cooling air in air passages 144 and/or 146.

Exhaust passage 148 can receive exhaust gasses from other cylinders of engine 10 in addition to cylinder 14. Exhaust gas sensor 128 is shown coupled to exhaust passage 148 upstream of turbine 176 and emission control device 178. In an alternate embodiment, exhaust gas sensor 128 may be coupled to exhaust passage 149 downstream of turbine 176 and upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passages 148 and 149. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The opening and closing of the valves may be controlled by hydraulically actuated lifters coupled to valve pushrods, or via a cam profile switching mechanism. For example, intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In one specific example, twin independent variable cam timing may be used, where each of the intake cam and the exhaust cam can be independently adjusted by the control system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used.

Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 1 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; throttle inlet pressure (TIP) from sensor 125, and absolute manifold air pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 124 may be used to provide an indication of vacuum, or pressure, in the intake manifold. Further, manifold pressure may be estimated based on other operating parameters, such as based on MAF and RPM, for example.

Figure 2:
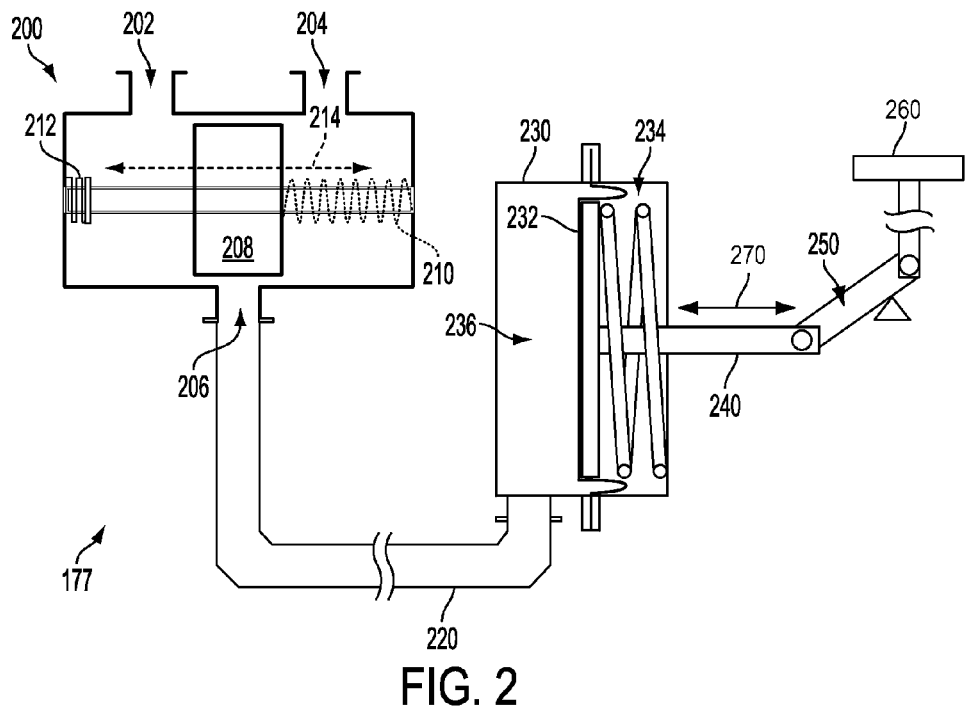
FIG. 2 shows a schematic of a wastegate including a solenoid valve, a wastegate canister, and a wastegate arm for actuating a wastegate valve.

Continuing now with FIG. 2, a schematic of an example embodiment of wastegate 177 including solenoid valve 200, wastegate canister 230, wastegate arm 240, mechanical linkages 250, and valve face 260 is illustrated. Mechanical linkages 250 may convert the translational motion of mechanical arm 240 into a rotational motion of the wastegate valve. In other words, by moving mechanical arm along direction 270, the wastegate valve may open or close so that exhaust gasses may be directed away from or toward turbine 176, respectively. Wastegate arm 240 is attached to diaphragm 232 such that when a pressure difference is created across diaphragm 232, it may force wastegate arm 240 away from its default position and open the wastegate valve. Spring 234, attached to wastegate arm 240, forces wastegate arm 240 toward its default position. For example, spring 234 may be compressed when the wastegate valve is closed to provide a preload force acting on the wastegate valve. The preload force acts in an opposite direction to the force generated by the pressure difference across diaphragm 232. The preload force may be proportional to a spring constant of spring 234 multiplied by the distance spring 234 is compressed, as determined from Hooke's law. In the example embodiment, the default position of wastegate arm 240 closes the wastegate valve.

The position of the wastegate valve is determined by the pressure inside canister volume 236 which is determined by the flow of gasses between solenoid valve 200 and canister volume 236 via connecting tube 220. Gas flow is determined by the position of shuttle 208 and the pressures at first port 202, second port 204, and control port 206. Shuttle 208 may move along direction 214 as determined by the forces from coil 212 and spring 210. In the example embodiment, first port 202 is connected to intake passage 146 at boost pressure, second port 204 is connected to intake passage 142 at atmospheric pressure, and control port 206 is connected to canister volume 236 at canister pressure.

In FIG. 2, shuttle 208 is blocking control port 206 so gasses are substantially prevented from flowing between solenoid valve 200 and wastegate canister 230. In the example embodiment, the position of shuttle 208 in FIG. 2 may be in a transient position. FIG. 3 illustrates the position of shuttle 208 in a steady-state position when coil 212 is discharged, such as when the WGC signal is driven low. When the coil is discharged, the force of spring 210 acting on shuttle 208 may hold shuttle 208 near spring 210 in solenoid valve 200. In this position, port 204 is blocked by shuttle 208 and a channel is open between ports 202 and 206. When the boost pressure exceeds the canister pressure, gasses may flow from port 202 to 206 as shown by arrows 300, and the canister pressure may be increased.

FIG. 4 illustrates shuttle 208 in a steady-state position when coil 212 is charged, such as when the WGC signal is driven high. When the coil is charged, the force of coil 212 may exceed the force of spring 210 acting on shuttle 208 so shuttle 208 may be positioned near coil 212 in solenoid valve 200. In this position, port 202 is blocked by shuttle 208 and a channel is open between ports 204 and 206. When the canister pressure exceeds the atmospheric pressure, gasses may flow from port 206 to 204 as shown by arrows 400, and the canister pressure may be decreased.

Pulse width modulation (PWM) may be used to drive the WGC signal connected to coil 212. A PWM signal may alternate between a high value and a low value at a given frequency and a duty cycle, where the duty cycle is defined as the proportion of time the signal is high divided by the period of the signal. In this manner, shuttle 208 may be actuated in a first direction (opening the channel between ports 204 and 206) when the WGC signal is high and shuttle 208 may be actuated in a second direction opposite the first direction (opening the channel between ports 202 and 206) when the WGC signal is low. The duty cycle of the WGC signal may range between zero and one to vary the canister pressure between the boost pressure and the atmospheric pressure. For example, at one limit of the duty cycle, the canister pressure may be equal to the boost pressure. At the opposite limit of the duty cycle, the canister pressure may be equal to the atmospheric pressure. However, by controlling the duty cycle of the WGC signal to an intermediate value, an intermediate canister pressure between the boost pressure and atmospheric pressure may be maintained in canister volume 236.

The prophetic data of FIG. 5 illustrates how a PWM signal may be used to control the wastegate canister pressure. In FIG. 5, the intermediate canister pressure may be obtained by modulating the WGC signal at approximately 32 Hz. The PWM period can be measured as the time between peaks 510 or valleys 520 of the canister pressure. In alternative embodiments, the PWM frequency may be less than 300 Hz.

The average canister pressure may be increased by increasing the duration that ports 202 and 206 are in communication, such as when the WGC signal is low and coil 212 is discharged. In this manner, the canister pressure may be increased toward the boost pressure. The average canister pressure may be decreased by increasing the duration that ports 204 and 206 are in communication, such as when the WGC signal is high and coil 212 is charged. In this manner, the canister pressure may be decreased toward atmospheric pressure. Thus, the canister pressure may be adjusted by adjusting the duty cycle of the WGC signal. Specifically, the canister pressure may be increased by decreasing the duty cycle of the WGC signal and the canister pressure may be decreased by increasing the duty cycle of the WGC signal.

The canister pressure may be determined by the duty cycle of the WGC signal, the boost pressure, and the atmospheric pressure. For different atmospheric pressures, a given wastegate command may change the canister pressure by different amounts. For example, at high altitudes with lower atmospheric pressure, a difference between the boost pressure and the atmospheric pressure is greater than at low altitudes with higher atmospheric pressure. As the difference between the boost pressure and the atmospheric pressure increases, the canister pressure may be changed more rapidly. Thus, a wastegate command may be adjusted according to atmospheric pressure. For example, as atmospheric pressure increases, the wastegate command may be adjusted to increase actuation of the wastegate. As atmospheric pressure decreases, the wastegate command may be adjusted to decrease actuation of the wastegate. Similarly for different boost pressures, the wastegate command changes the canister pressure by different amounts. For example, as the boost level increases, the canister pressure may change more rapidly and the wastegate duty cycle may be adjusted to reduce the actuation of the wastegate.

The actuation of the waste gate may be determined by the canister pressure and other forces acting on the wastegate valve. FIG. 6 illustrates an example embodiment of a wastegate valve 600 for controlling the flow of exhaust gasses between exhaust passage 148 and exhaust passage 147. For example, if wastegate valve 600 is open, some exhaust gasses may be routed from exhaust passage 148 through exhaust passage 147 bypassing turbine 176. The degree of opening of wastegate valve 600 may determine the amount of exhaust gas bypassing turbine 176. As another example, if wastegate valve 600 is closed, the exhaust gasses may be routed through exhaust passage 148 to turbine 176.

Wastegate valve 600 may include mechanical linkage 250 and valve face 260. Valve face 260 may be actuated through a range from closed to fully open. In one embodiment, wastegate valve 600 may be closed when valve face 260 is pressed against a wall of exhaust passage 148. In one embodiment, wastegate valve 600 may be fully open, or wide open, if wastegate arm 240 or valve face 260 are pressed against a mechanical stop. In an alternate embodiment, wastegate valve 600 may be fully open if a cross-sectional area of a passage of wastegate valve 600 is greater than or equal to a cross-sectional area of exhaust passage 147.

Mechanical linkage 250 is pneumatically actuated using the canister pressure to control the degree of opening of wastegate valve 600. For example, the canister pressure via mechanical linkage 250 may impart a canister force, $F_{CAN}$, directed in an x direction 620. Spring 234 may be compressed when wastegate valve 600 is closed to provide a preload force of wastegate valve 600 acting in a direction opposite the canister force. Thus, exhaust pressure may build and supply turbine 176 with energy prior to wastegate valve 600 opening. The preload force, $F_{PRELOAD}$, may be proportional to the spring constant of spring 234 multiplied by the distance spring 234 is compressed, as determined from Hooke's law. Other forces acting on wastegate valve 600 include forces proportional to pressures of exhaust passages 147 and 148 multiplied by a surface area of valve face 260. For example, an exhaust force, $F_{TURBOINLET}$, acting in the x direction 620 may be proportional to the pressure in exhaust passage 148 multiplied by the surface area of valve face 260. In other words, $F_{TURBOINLET}$ may be proportional to the pressure upstream of the inlet of turbine 176. As another example, another exhaust force, $F_{TURBOOUTLET}$, acting opposite of the x direction 620 may be proportional to the pressure in exhaust passage 147 multiplied by the surface area of valve face 260. In other words, $F_{TURBOOUTLET}$ may be proportional to the pressure downstream of the outlet of turbine 176. Thus, a net force due to exhaust forces, or valve force, $F_{VALVE}$, may act on wastegate valve 600. For example, the valve force may equal a difference between $F_{TURBOINLET}$ and $F_{TURBOOUTLET}$ which may be proportional to a difference between the turbine inlet pressure and the turbine outlet pressure.

The position of valve face 260 may be determined by calculating the balance of forces acting on valve face 260. Wastegate valve 600 may start to crack open when the sum of the forces is equal to zero:

$$0 = F_{CAN} + F_{VALVE} - F_{PRELOAD} - F_{AMB}, \text{ and,}$$

$$F_{CAN} = F_{PRELOAD} + F_{AMB} - F_{VALVE}.$$

Thus, a canister pressure for opening wastegate valve 600, or a crack open pressure, may be determined for an engine operating condition. For example, less canister pressure may be needed to open wastegate valve 600 as the ambient pressure is decreased and more canister pressure may be needed to open wastegate valve 600 as the ambient pressure is increased. As another example, less canister pressure may be needed to open wastegate valve 600 as the exhaust pressure (e.g. the turbine inlet pressure) is increased and more canister pressure may be needed to open wastegate valve 600 as the exhaust pressure (e.g. the turbine inlet pressure) is decreased. The canister pressure may vary between the boost pressure and the atmospheric pressure as commanded by the wastegate duty cycle. The range of canister pressures that are possible at each engine operating condition may determine a range of actuation of valve face 260 and the degree of opening of wastegate valve 600. For example, at a first engine operating condition, the boost pressure may be less than the crack open pressure and valve face 260 cannot be actuated. At a second engine operating condition, the canister pressure may be greater than the crack open pressure and less than the pressure for fully opening wastegate valve 600. The position of valve face 260 may be between the closed and the fully open positions. The position of valve face 260 may be determined by calculating where the forces acting to open wastegate valve 600 are balanced by the forces acting to close wastegate valve 600. At a third engine operating condition, the canister pressure may be greater than or equal to the pressure for fully opening wastegate valve 600, and valve face 260 may be actuated to the fully open position.

Thus, valve face 260 may be actuated within an actuation range that may vary with engine operating conditions. For example, limits of the actuation range may vary with boost pressure, valve force due to exhaust pressures, and atmospheric pressure. As another example, limits of the actuation range may vary with boost pressure, turbine inlet pressure, turbine outlet pressure, and atmospheric pressure. As yet another example, limits of the actuation range may vary with boost pressure, atmospheric pressure, and a difference between the turbine inlet pressure and the turbine outlet pressure. Accordingly, FIG. 7 shows prophetic data of how the wastegate actuator range may vary across different engine operating conditions. Specifically, FIG. 7 illustrates a normalized wastegate position versus a pressure fraction of engine 10. The normalized wastegate position may range from zero to one, where zero indicates wastegate valve 600 is closed and one indicates wastegate valve 600 is fully wide open. The pressure fraction may be defined as a wastegate actuation pressure divided by the pressure across compressor 174, where the wastegate actuation pressure is a difference between the canister pressure and the atmospheric pressure. In one embodiment, the pressure across compressor 174 is the difference between the boost pressure and the atmospheric pressure. As such, the graph illustrates the interrelationship between the range limits and various pressures, such as atmospheric pressure, boost pressure, and valve force due to exhaust pressures.

The pressure fraction typically ranges between zero and one. The pressure fraction may equal or approach zero as the canister pressure approaches atmospheric pressure. For example, the canister pressure may be near atmospheric pressure at one limit of the wastegate duty cycle. The canister pressure may be less than the crack open pressure as the pressure fraction approaches zero. At the opposite limit of the wastegate duty cycle, the canister pressure may be near the boost pressure, and the pressure fraction may be near one. In one example, the pressure fraction may be greater than one during a transient condition if boost pressure decreases faster than high pressure gas flows out of canister volume 236.

The pressure fraction may be adjusted between zero and one according to the wastegate duty cycle. If the boost pressure is less than the crack open pressure, then wastegate valve 600 cannot be opened and the actuation range of valve face 260 is zero. However, as boost pressure increases, the boost pressure may be greater than the crack open pressure and wastegate valve 600 may be opened. If the boost pressure is less than the pressure for fully opening wastegate valve 600, the actuation range may be limited. For example, engine operating curve 710 may represent the normalized wastegate position versus the pressure fraction for a constant boost pressure that is greater than the crack open pressure and less than the pressure for fully opening wastegate valve 600. Engine operating point 712 illustrates the crack open pressure and engine operating point 714 illustrates where the canister pressure is equal to the boost pressure. Wastegate valve 600 has a limited range 716 and cannot be fully opened because the boost pressure is less than the pressure for fully opening wastegate valve 600. The degree of opening of wastegate valve 600 may be adjusted according to the wastegate duty cycle. However, wastegate valve 600 may not be actuated unless the wastegate duty cycle increases the canister pressure to greater than the crack open pressure. In other words, the wastegate duty cycle may lose authority to actuate wastegate valve 600 below a lower bound of a range.

In another example, boost pressure may be further increased, such as at engine operating curve 720. Engine operating curve 720 may represent the normalized wastegate position versus the pressure fraction for a constant boost pressure that is greater than the pressure for fully opening wastegate valve 600. Engine operating point 722 illustrates the crack open pressure and engine operating point 724 illustrates the canister pressure for fully opening wastegate valve 600. Wastegate valve 600 may be actuated over the full actuation range between closed and wide open as illustrated by range 726. If the wastegate duty cycle increases the canister pressure to more than the pressure for fully opening wastegate valve 600 (e.g. operating point 724), wastegate valve 600 may not be opened further than wide open. In other words, the wastegate duty cycle may lose authority to actuate wastegate valve 600 above an upper bound of a range.

The crack open pressure may decrease as the turbine inlet pressure and the valve force increase. For example, the crack open pressure at engine operating point 722 is less than the crack open pressure at engine operating point 712. Additionally, the pressure fraction at engine operating point 722 at greater boost pressure may be less than the pressure fraction at engine operating point 712 at lower boost pressure. In other words, as boost pressure increases, wastegate valve 600 may open at a decreased pressure fraction.

It may be desirable to calculate the actuation range of wastegate valve 600 as engine operating conditions vary. For example, the actuation range of wastegate valve 600 may be calculated according to the boost pressure, atmospheric pressure, turbine inlet pressure, and turbine outlet pressure. In one embodiment, sensors may measure the boost pressure, turbine inlet and/or turbine outlet pressures, and atmospheric pressure. For example, sensor 125 may measure the boost pressure, sensor 123 may measure the atmospheric pressure, and sensors may be disposed in exhaust passages 148 and 147 for measuring the turbine inlet and/or the turbine outlet pressures.

In an alternative embodiment, the valve force due to exhaust pressures may be estimated from other engine operating conditions. For example, the valve force due to exhaust pressures may be estimated from the pressure across compressor 174. In other words, the valve force may be correlated with a difference between the boost pressure and the atmospheric pressure, as illustrated in the prophetic data of FIG. 8. For example, the difference between the boost pressure and the atmospheric pressure may be plotted versus the valve force. In one embodiment, the valve force may be estimated by bounding the valve force with a linear function, such as with linear function 810. In one example, the valve force may be estimated as a linear function with a slope of between one and six. In other words, the valve force may be estimated as between one and six times the difference between the boost pressure and the atmospheric pressure. In another example, the valve force may be estimated to be three times the difference between the boost pressure and the atmospheric pressure. In an alternate embodiment, the valve force may be estimated by bounding the valve force with a quadratic function. In yet another embodiment, a best-fit line may be used to estimate the valve force.

The valve force, the boost pressure, and the atmospheric pressure may affect the dynamics of wastegate valve 600. The canister pressure and wastegate valve dynamics may determine the degree that the wastegate valve is open or closed which may determine the energy produced by the turbine and hence the boost. Since the boost pressure is the controlled variable and also the source for powering wastegate 177, a control method that decouples the interaction between powering wastegate 177 and controlling the boost is desirable.

As further elaborated with reference to FIGS. 9 and 10, a method 900 may be executed by an engine controller, such as 12, for controlling the turbocharger via boost-based wastegate 177. In one example, a method of controlling a turbocharger of an engine via a wastegate may comprise determining an atmospheric pressure, an actual boost pressure, and a valve force. Wastegate 177 may be adjusted within limits of a range, the range varying with atmospheric pressure, actual boost pressure, and valve force. The adjustment of wastegate 177 may be limited when outside the limits of the range.

Continuing with FIG. 9, at 910, the method includes determining a desired boost according to engine operating conditions. The conditions assessed may be directly measured with sensors, such as sensors 116, 120, 122, 123, and 128 for example, and/or the conditions may be estimated from other engine operating conditions. The assessed conditions may include engine oil temperature, engine speed, idle speed, barometric pressure, a driver-demanded torque (for example, from a pedal-position sensor), manifold air flow (MAF), air temperature, vehicle speed, etc.

Next, at 920, the actual boost pressure, atmospheric pressure, and valve force may be determined. The actual boost pressure may be directly measured from a sensor, such as sensor 125. The measurement may be sent to controller 12 via the TIP signal and stored in a computer readable storage medium. In an alternative embodiment, the actual boost may be estimated based on other operating parameters, such as based on MAP and RPM, for example. In one embodiment, the atmospheric pressure may be determined via a sensor. For example, atmospheric pressure may be measured near the compressor inlet, such as with sensor 123. The measurement may be sent to controller 12 via the PA signal and stored in a computer readable storage medium. In an alternative embodiment, the atmospheric pressure may be estimated based on other operating parameters. In one embodiment, the valve force may be determined via sensors disposed in exhaust passages 148 and 147. In an alternative embodiment, the valve force may be estimated with a function, such as elaborated in FIG. 8, according to the actual boost pressure and the atmospheric pressure.

Next, at 930, and as further elaborated in FIG. 10, a wastegate valve actuation range may be determined according to the boost pressure, valve force, and atmospheric pressure. From the limits of the wastegate valve actuation range, a wastegate actuator authority may be determined. For example, a closed loop feedback control system may control the boost pressure by commanding wastegate 177. The feedback control system may adjust the wastegate duty cycle within the wastegate valve actuation range to control the boost pressure. However, it may not be desirable for the feedback control system to adjust the wastegate duty cycle outside of the authority of the wastegate duty cycle to actuate the wastegate valve. For example, the feedback loop may be broken if the wastegate duty cycle is adjusted outside of the limits of the authority of the wastegate duty cycle. If the feedback loop is broken, control of the boost pressure may be less predictable than desired.

In one embodiment, the lower limit of the wastegate valve actuation range may be determined by calculating the crack open pressure for the boost pressure, ambient pressure, and valve force from 920. If the crack open pressure is greater than the boost pressure, then wastegate valve 600 cannot be actuated and the wastegate valve actuation range is zero. In other words, the wastegate duty cycle has no authority to actuate the wastegate valve. If the crack open pressure is less than the boost pressure, then the upper limit of the wastegate valve actuation range may be determined. For example, at one end of the wastegate duty cycle, the steady state canister pressure may be near the boost pressure. Thus, the boost pressure may be substituted for the canister pressure and the upper limit of the wastegate valve actuation range may be determined as the position of valve face 260 where the balance of forces acting on wastegate valve 600 are balanced. However, valve face 260 may not be actuated beyond the fully open position and so the upper limit of the wastegate actuation range is bounded by the fully open position. Increasing the canister pressure above the pressure for fully opening wastegate valve 600 may not further reduce the boost pressure since wastegate valve 600 is already fully open. Thus, beyond the upper limit of the wastegate valve actuation range, the wastegate duty cycle has no authority to actuate the wastegate valve. Similarly, below the lower limit of the wastegate valve actuation range, the wastegate duty cycle has no authority to actuate the wastegate valve.

Next, at 940, and as further elaborated in FIG. 10, wastegate 177 may be adjusted according to limits of the wastegate valve actuation range, desired boost pressure, actual boost pressure, atmospheric pressure, and valve force. The wastegate may be adjusted in one manner when within the limits of the wastegate valve actuation range and in a different manner when outside the limits of the wastegate valve actuation range. For example, the adjustment of the wastegate may be limited when outside the limits of the wastegate valve actuation range.

The wastegate may be adjusted according to a wastegate actuation force, the wastegate actuation force calculated from the difference between the actual boost and atmospheric pressure. Since the wastegate actuation force may accurately resemble the pressure differential between first port 202 and second port 204 of solenoid valve 200, the interaction between powering wastegate 177 and controlling the boost may be reduced. For example, the wastegate actuation force may be used as an input to an inverse wastegate model. The inverse wastegate model may map a desired wastegate canister pressure or a desired wastegate valve position to a wastegate duty cycle for a given wastegate actuation force. Mapping to a wastegate duty cycle may include using look-up tables or calculating the wastegate duty cycle. The WGC signal may be pulse width modulated at the wastegate duty cycle to adjust the wastegate. The desired wastegate canister pressure or the desired wastegate valve position may be determined from feed-forward, feedback, or other control algorithms, for example.

The wastegate actuation force may also affect the dynamics of the wastegate. For example, canister volume 236 may fill faster at higher altitudes having lower atmospheric pressures than at lower altitudes having higher atmospheric pressures. A compensation term may account for delays of the wastegate actuator, as described herein with regard to the controller with zeros cancelling poles of the wastegate actuator model. The compensation term may be decreased for lower atmospheric pressures to account for faster dynamic actuation of the wastegate valve at lower atmospheric pressures. Similarly, the compensation term may be increased for higher atmospheric pressures to account for slower dynamic actuation of the wastegate valve at higher atmospheric pressures. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

In another example, the compensation term may be adjusted to account for blow-through (e.g. scavenging) operation with large valve overlap. In a turbocharged (boosted) engine, blow-through may occur when the intake pressure is higher than the valve force, and some amount of fresh air may flow directly from the intake manifold to the exhaust manifold during the valve overlap period without participating in cylinder combustion. Boosted engines may be intentionally operated in this way by advancing intake cam timing and retarding the exhaust cam timing to improve volumetric efficiency and reduce turbo lag. However, the blow-through air is cooler (because it is not combusted) and hence adds less energy to the exhaust system and the turbine compared to an engine without blow-through. To account for the blow-through air, the wastegate operation may be adjusted for the fraction of blow-through air by modifying the feedforward schedules and increasing the feedback gains. For example, increasing the compensation term may account for the lower exhaust energy that may result in lower gain in the feedback loop and slower system response without this adjustment. In yet another example, the compensation term may be adjusted to account for changes in boost pressure caused by movement of throttle plate 164.

The wastegate may be adjusted according to the desired boost. For example, the desired boost may be used as an input to a feed-forward control algorithm for adjusting the wastegate. The feed-forward control algorithm may calculate a target wastegate canister pressure or a target wastegate valve position that may be used as a component of an input to the inverse wastegate model to determine the wastegate duty cycle.

The wastegate may be adjusted according to a boost error. The boost error may be calculated as a difference between the desired boost and the actual boost. For example, the boost error may be used as an input to the feedback control system to calculate a target wastegate canister pressure or a target wastegate valve position that may be used as a component of an input to the inverse wastegate model to determine the wastegate duty cycle. The control system may include a compensation term to account for delays caused by filling and emptying canister volume 236. The magnitude of the compensation term may be increased as atmospheric pressure increases to account for slower filling and emptying of canister volume 236. The magnitude of the compensation term may be decreased as atmospheric pressure decreases to account for faster filling and emptying of canister volume 236.

In one embodiment, a feedback control system may include an integral term for steady state tracking. In other words, the integral term may reduce the steady state error of the feedback control system. However, the integral term may wind up if the feedback control system cannot control the boost pressure in the desired manner, such as when the wastegate duty cycle is outside the limits of the wastegate actuation range. Thus, the integral term may be frozen when the wastegate duty cycle is outside the limits of the wastegate actuation range to reduce or prevent integrator windup.

The wastegate duty cycle may be adjusted when outside of the limits of the wastegate actuation range when the wastegate duty cycle does not have authority to actuate wastegate valve 600. For example, the wastegate duty cycle may be adjusted to reduce the canister pressure if the canister pressure is greater than the pressure for fully opening wastegate valve 600.

In this manner, method 900 may be used to substantially reduce the interaction between powering wastegate 177 and controlling the boost. As further elaborated with reference to FIG. 10, one embodiment of method 900 may include steps such as method 1000. For example, a desired boost may be calculated according to engine operating conditions (e.g. at 910). The desired boost may be used as an input to a feed-forward control system 1010 and a feedback control system 1020. A feed-forward output 1012 and a feedback output 1021 may be summed at 1030 to generate a target wastegate canister pressure 1032. Target wastegate canister pressure 1032 and a wastegate actuation force 1042 may be used as inputs to an inverse wastegate model 1050. The wastegate actuation force 1042 may be calculated at 1040 as a difference between the actual boost pressure and the atmospheric pressure (e.g. the actual boost pressure and the atmospheric pressure may be determined at 920). Inverse wastegate model 1050 may output a wastegate duty cycle 1052 to an input of plant 1060 including engine 10 and wastegate 177. Wastegate duty cycle 1052 may actuate the wastegate valve to generate the actual boost pressure.

Feed-forward control 1010 calculates feed-forward output 1012 which is one component of target wastegate canister pressure 1032. Feed-forward control 1010 may include a static feed-forward term and/or a dynamic feed-forward term. The static feed-forward term may calculate a feed-forward component from one or more engine operating conditions, including the desired boost, for example. The dynamic feed-forward term may calculate a feed-forward component from a time rate of change of one or more engine operating conditions, including a time rate of change of the desired boost, for example. In one embodiment, feed-forward control 1010 may generate a component of a target wastegate canister pressure. In an alternate embodiment, feed-forward control 1010 may generate a component of a target wastegate valve position.

Inverse wastegate model 1050 includes an input for wastegate actuation force 1042. In one embodiment, inverse wastegate model 1050 may include an input for target wastegate canister pressure 1032. Inverse wastegate model 1050 may map the target wastegate canister pressure 1032 to wastegate duty cycle 1052 for wastegate actuation force 1042. For example, the WGC signal may be pulse width modulated at wastegate duty cycle 1052 to adjust wastegate 177 of engine 10. Plant 1060 includes engine 10. In an alternate embodiment, inverse wastegate model 1050 may include an input for a target wastegate valve position, and inverse wastegate model 1050 may map the target wastegate valve position to wastegate duty cycle 1052 for wastegate actuation force 1042.

Feedback control 1020 calculates feedback output 1021 which is one component of target wastegate canister pressure 1032. Feedback control 1020 may include a proportional term 1024 ("P") and integral term 1028 ("I"). Optionally, feedback control 1020 may include a derivative term 1026 ("D"). Thus, feedback control 1020 may be referred to as proportional-integral (PI) controller or a proportional-integral-derivative (PID) controller. Feedback control 1020 may attempt to minimize a boost pressure error by adjusting feedback output 1021. In one embodiment, feedback output 1021 may be a wastegate canister pressure. In an alternate embodiment, feedback output 1021 may be a target wastegate valve position. The boost pressure error may be calculated at 1022 and used as an input to proportional term 1024, integral term 1028, and derivative term 1026. Proportional term 1024 may calculate a component of feedback output 1021 that is proportional to the boost pressure error. Derivative term 1026 may calculate a component of feedback output 1021 that is proportional to the time rate of change of the boost pressure error. Integral term 1028 may calculate a component of feedback output 1021 that is proportional to the accumulated errors of the boost pressure error. The outputs of proportional term 1024, integral term 1028, and derivative term 1026 may be added at 1029 to generate feedback output 1021.

As previously discussed, integral term 1028 may wind up if the feedback loop is broken, such as when wastegate duty cycle 1052 loses authority to actuate wastegate valve 600. Thus, a wastegate actuator authority 1072 may be determined at 1070 and used as an input to feedback control 1020 and specifically, integral term 1028. If wastegate duty cycle 1052 has authority, integral term 1028 may be updated with the current boost pressure error. If wastegate duty cycle 1052 does not have authority, integral term 1028 may be frozen and the current boost pressure error may be discarded by the integral term 1028. In one embodiment, if wastegate duty cycle 1052 does not have authority, the output of integral term 1028 may be adjusted to reduce target canister pressure 1032. For example, the output of integral term 1028 may be decreased in response to wastegate duty cycle 1052 not having authority (e.g. the wastegate actuator is outside the limits of the wastegate actuation range).

Feedback control 1020 may include a lead/lag filter, or compensation term, to account for the dynamics of wastegate canister 230 filling and emptying. The compensation term may be adjusted according to wastegate duty cycle 1052 or wastegate actuation force 1042. For example, the feedback control 1020 may have a transfer function such as:

$$-((twg*s+1)/(C_1*s+1))*((kp*s+ki)/(s)),$$

where twg is the time constant of the wastegate, and $C_1$ may be experimentally determined for a system. In one embodiment, $C_1$ may be 0.05. The zero of the lead filter (1/twg) may be used to cancel the pole from the wastegate canister pressure dynamics. The zero of the PI controller (ki/kp) may be used to cancel the system pole (1/tsys), where tsys is the time constant of the open loop system.

At 1070, wastegate actuator authority 1072 may be determined from a wastegate valve actuation range 1082 and a desired pressure fraction 1092. For example, desired pressure fraction 1092 may be compared to the range of pressure fractions associated with wastegate valve actuation range 1082. If desired pressure fraction 1092 is within the range of pressure fractions associated with wastegate valve actuation range 1082, wastegate duty cycle 1052 may have authority to actuate wastegate valve 600. However, if desired pressure fraction 1092 is outside the range of pressure fractions associated with wastegate valve actuation range 1082, wastegate duty cycle 1052 may not have authority to actuate wastegate valve 600.

In one embodiment, at 1080, wastegate valve actuation range 1082 may be calculated from the atmospheric pressure, the preload force, and the actual boost pressure. The valve force due to exhaust pressures may be estimated (e.g. at 920) as a function of the actual boost pressure and the atmospheric pressure. Thus, forces acting on wastegate valve 600 may be calculated and wastegate valve actuation range 1082 may be determined. In an alternate embodiment, the valve force due to exhaust pressures may be calculated (e.g. at 920) based on a measurement from a sensor disposed in exhaust passage 148 and wastegate valve actuation range 1082 may be calculated from the exhaust pressure, the atmospheric pressure, the preload force, and the actual boost pressure. In an alternate embodiment, the valve force due to exhaust pressures may be calculated (e.g. at 920) based on measurements from sensors disposed in exhaust passages 148 and 147, and wastegate valve actuation range 1082 may be calculated from the exhaust pressure, the atmospheric pressure, the preload force, and the actual boost pressure.

In one embodiment, desired pressure fraction 1092 may be generated by wastegate transfer function 1090 using wastegate duty cycle 1052 and wastegate actuation force 1042 as inputs. Thus, wastegate transfer function 1090 may map wastegate duty cycle 1052 and wastegate actuation force 1042 to desired pressure fraction 1092. In an alternate embodiment, wastegate transfer function 1090 may map wastegate duty cycle 1052 and wastegate actuation force 1042 to a desired target canister pressure.

In this manner, method 1000 may substantially reduce the interaction between powering wastegate 177 and controlling the actual boost pressure. Specifically, the adjustment of the wastegate actuator may be limited when outside a range that may vary with boost pressure, atmospheric pressure, and exhaust pressure. In this way, the limits of the range may be calculated and used to freeze the integral term when the wastegate actuator is commanded to actuate the wastegate outside of the range. Thus, integrator windup of the feedback control system may be prevented or reduced to increase predictability of the feedback control system and to increase controllability of the boost pressure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of controlling a turbocharger of an engine via a wastegate, the turbocharger including a turbine, comprising:
  actuating the wastegate with boost pressure generated by the turbocharger; and
  limiting adjustment of a wastegate actuator when outside a range, limits of the range varying with boost pressure, turbine inlet pressure, turbine outlet pressure, and atmospheric pressure, the range being increased as a difference between the turbine inlet pressure and the turbine outlet pressure is increased.

2. The method of claim 1, wherein the range is increased as the boost pressure is increased.

3. The method of claim 1, wherein the range is decreased as the boost pressure is decreased.

4. The method of claim 1, wherein the range is increased as the atmospheric pressure is decreased.

5. The method of claim 1, wherein the range is decreased as the atmospheric pressure is increased.

6. The method of claim 1, wherein the range is decreased as the difference between the turbine inlet pressure and the turbine outlet pressure is decreased.

7. The method of claim 1, further comprising:
adjusting the wastegate in response to delays of the wastegate actuator.

8. The method of claim 1, further comprising:
determining a target canister pressure of the wastegate via a feedback control system including an integral term; and
calculating a wastegate duty cycle according to the target canister pressure of the wastegate and a difference between the boost pressure and the atmospheric pressure.

9. The method of claim 8, wherein the integral term is frozen in response to the wastegate actuator being outside the limits of the range.

10. The method of claim 8, further comprising:
adjusting the wastegate duty cycle in response to determining the wastegate duty cycle does not have authority.

11. The method of claim 1, further comprising:
estimating a valve force according to the boost pressure and the atmospheric pressure.

12. A method of controlling a turbocharger of an engine via a wastegate, the wastegate comprising a first port coupled to boost pressure, a second port coupled to atmospheric pressure, and a valve configured to control a flow of exhaust gasses according to a wastegate duty cycle, the turbocharger comprising a turbine, the method comprising:
actuating the wastegate with boost pressure generated by the turbocharger and with atmospheric pressure; and
limiting adjustment of a wastegate actuator when outside a range, limits of the range varying based on an interrelationship between boost pressure, atmospheric pressure, and a difference between a turbine inlet pressure and a turbine outlet pressure.

13. The method of claim 12, wherein an upper limit of the range is increased as the boost pressure is increased, the upper limit of the range is decreased as the boost pressure is decreased, the upper limit of the range is increased as the atmospheric pressure is decreased, the upper limit of the range is decreased as the atmospheric pressure is increased, the upper limit of the range is increased as the difference between the turbine inlet pressure and the turbine outlet pressure is increased, and the upper limit of the range is decreased as the difference between the turbine inlet pressure and the turbine outlet pressure is decreased.

14. The method of claim 12, further comprising:
determining a target canister pressure of the wastegate via a feedback control system including an integral term; and
calculating the wastegate duty cycle according to the target canister pressure of the wastegate and a difference between the boost pressure and the atmospheric pressure.

15. The method of claim 14, wherein the integral term is frozen in response to the wastegate actuator being outside the limits of the range.

16. The method of claim 14, wherein the integral term is decreased in response to the wastegate actuator being outside the limits of the range.

17. A method of controlling a turbocharger of an engine via a wastegate, the turbocharger including a turbine, comprising:
actuating the wastegate with boost pressure generated by the turbocharger;
limiting adjustment of a wastegate actuator when outside a range, limits of the range varying with boost pressure, turbine inlet pressure, turbine outlet pressure, and atmospheric pressure;
determining a target canister pressure of the wastegate via a feedback control system including an integral term; and
calculating a wastegate duty cycle according to the target canister pressure of the wastegate and a difference between the boost pressure and the atmospheric pressure.

18. The method of claim 17, wherein the integral term is frozen in response to the wastegate actuator being outside the limits of the range.

19. The method of claim 17, further comprising:
adjusting the wastegate duty cycle in response to determining the wastegate duty cycle does not have authority.

\* \* \* \* \*